US012795151B2

(12) United States Patent
Wu et al.

(10) Patent No.: US 12,795,151 B2
(45) Date of Patent: Nov. 10, 2026

(54) HARDWARE FRIENDLY DESIGN FOR MOTION FIELD PROCESSING AND QUALITY IMPROVEMENT OF MOTION FIELD

(71) Applicant: Apple Inc., Cupertino, CA (US)

(72) Inventors: Yeqing Wu, Cupertino, CA (US); Yunfei Zheng, Santa Clara, CA (US); Yixin Du, Milpitas, CA (US); Alican Nalci, Cupertino, CA (US); Hilmi E. Egilmez, Santa Clara, CA (US); Guoxin Jin, San Diego, CA (US); Alexandros Tourapis, Los Gatos, CA (US); Jun Xin, San Jose, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 19/284,368

(22) Filed: Jul. 29, 2025

(65) Prior Publication Data

US 2025/0373842 A1 Dec. 4, 2025

Related U.S. Application Data

(62) Division of application No. 18/593,281, filed on Mar. 1, 2024, now Pat. No. 12,395,672.

(Continued)

(51) Int. Cl.

*H04N 7/12* (2006.01)
*H04N 19/105* (2014.01)

(Continued)

(52) U.S. Cl.

CPC ........... *H04N 19/52* (2014.11); *H04N 19/105* (2014.11); *H04N 19/124* (2014.11);

(Continued)

(58) Field of Classification Search

CPC .................................................... H04N 19/176

See application file for complete search history.

(56) References Cited

U.S. PATENT DOCUMENTS

2026/0197488 A1* 7/2026 Zhang .................... H04N 19/52
2026/0197492 A1* 7/2026 Lee ...................... H04N 19/593

OTHER PUBLICATIONS

Peter de Rivaz et al., AV1 Bitstream & Decoding Process Specification, Copyright 2018, The Alliance for Open Media, pp. 1-681.

* cited by examiner

*Primary Examiner* — Y Lee
(74) *Attorney, Agent, or Firm* — BakerHostetler

(57) ABSTRACT

Techniques are proposed to improve temporal motion projection in video coding. Candidate reference frames available for use in temporal motion projection are sorted in processing order according to scores assigned based on estimates of the reference frames' suitability for prediction. Such estimates may be based on temporal distance between each candidate reference frame and that reference frame's prediction references. Estimates may be based, for each reference frame, based on an estimate of coding quality of a reference frame from which the respective candidate reference frame makes a prediction reference. Once sorted, the candidate reference frames may be processing in the sorting order to supply prediction data to a current frame that is to be coded from the candidate reference frames. Additionally, hardware friendly designs of motion field hole filling and motion vector smoothing operations are proposed. Such designs can reduce hardware implementation complexity and benefit hardware parallel processing in several aspects: by removing the dependency among different processing block rows for hole filling and motion vector smoothing so that it is becomes easier and friendlier to achieve hardware parallel processing; by reducing the hard- (Continued)

ware bandwidth loading overhead; by improving hardware pipeline throughput; and/or by avoiding adding a line buffer to store the data from the above row since a line buffer will increase hardware cost.

27 Claims, 4 Drawing Sheets

Related U.S. Application Data

(60) Provisional application No. 63/494,096, filed on Apr. 4, 2023.

(51) Int. Cl.

| | |
|---|---|
| ***H04N 19/124*** | (2014.01) |
| ***H04N 19/127*** | (2014.01) |
| ***H04N 19/154*** | (2014.01) |
| ***H04N 19/172*** | (2014.01) |
| ***H04N 19/176*** | (2014.01) |
| ***H04N 19/52*** | (2014.01) |

(52) U.S. Cl.

CPC ......... *H04N 19/127* (2014.11); *H04N 19/154* (2014.11); *H04N 19/172* (2014.11); *H04N 19/176* (2014.11)

100

200

FIG. 4
400
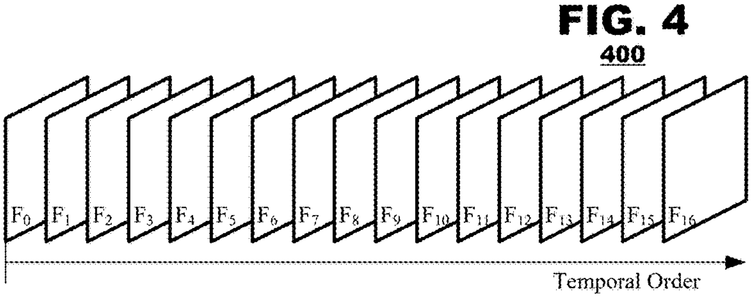
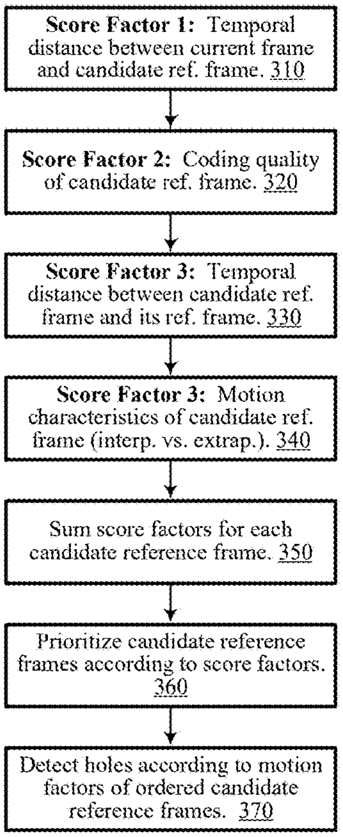
FIG. 5
500
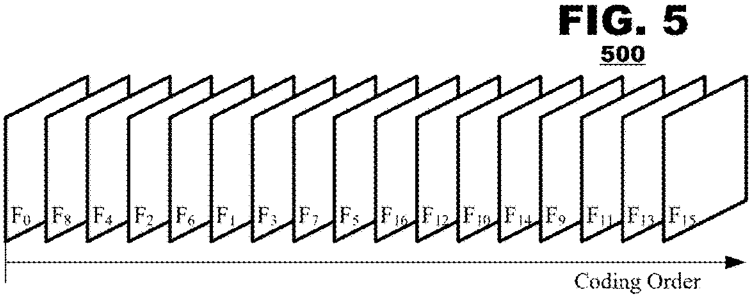
FIG. 6
600
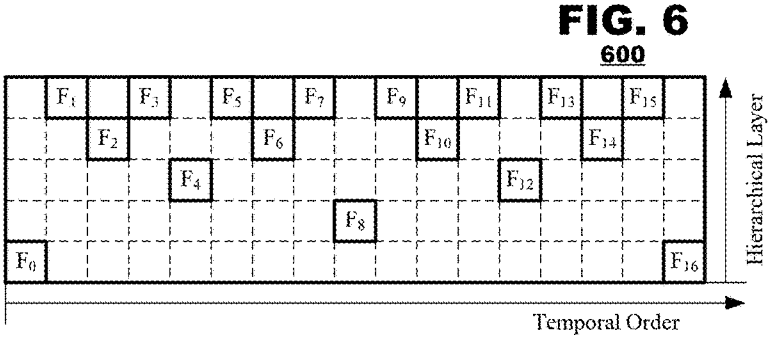
FIG. 3
300

700

800

HARDWARE FRIENDLY DESIGN FOR MOTION FIELD PROCESSING AND QUALITY IMPROVEMENT OF MOTION FIELD

CLAIM FOR PRIORITY

The present application benefits from priority of U.S. application Ser. No. 18/593,281, filed Mar. 1, 2024 and entitled "Hardware Friendly Design for Motion Field Processing and Quality Improvement of Motion Field," and U.S. application Ser. No. 63/494,096, filed Apr. 4, 2023 and entitled "Hardware Friendly Design for Motion Field Processing and Quality Improvement of Motion Field," the disclosures of which are incorporated herein in their entirety

BACKGROUND

The present disclosure relates to techniques for video coding and decoding and, in particular, to techniques for developing lists of temporal motion vector predictors for predictive coding.

In existing video coding standards, motion vector prediction is used to reduce the bits required to represent motion information that will be sent in bitstreams. Building a high quality motion vector predictor list is an important feature of this technique. Usually, the spatial and temporal correlation of motion vectors in a motion field is exploited. A temporal motion vector predictor (TMVP) is one kind of predictor generated by exploiting the already available motion vectors of reference frames that are coded before a new frame (called a "current" frame) is coded. One method to generate the TMVP is to project the motion vectors of the reference frames, which were used to predictively code content of the reference frames themselves, to the location of current coding frame. The projected motion vectors are then used for the coding process to generate the motion vector prediction (MVP) candidate list, or to create a new reference frame (e.g. temporal interpolation prediction, "TIP"), which helps improve coding efficiency.

The Alliance for Open Media proposes a video model (called "AVM") that selects two highest priority past reference frames and two highest priority future reference frames, if they exist, for a motion vector list to be used when coding a new input frame. Under such techniques, content for a current frame is predicted from the selected reference frames according to a fixed order of selection.

BRIEF DESCRIPTION OF THE DRAWINGS

FIG. 3 illustrates a method according to an embodiment of the present disclosure.

FIG. 4 illustrates an exemplary set of frames on which the method of FIG. 3 may operate arranged in temporal order.

FIG. 5 illustrates an exemplary set of frames on which the method of FIG. 3 may operate arranged in coding order.

FIG. 6 illustrates an exemplary set of frames on which the method of FIG. 3 may operate arranged according to a hierarchy of predictions.

DETAILED DESCRIPTION

Current techniques for generating motion prediction lists are sub-optimal because they fail to recognize properties of the candidate reference frames which themselves can provide information regarding their quality for prediction of content for a current frame. For example, these techniques fail to recognize that, when a given reference frame is coded with high quality, other reference frames that refer to the high-quality reference frame also may have high quality. These other reference frames also may be assigned relatively high priority as compared to other candidate reference frames.

Meanwhile, several algorithms are proposed to improve temporal motion projection, therefore, the coding performance, for video coding. To provide flexibility for different applications, achieve best performance, and to also improve error resiliency, high level syntaxes are designed to explicitly signal the motion projection scanning order to the decoder at different levels, such as sequence/frame/tile/slice level.

Additionally, hardware friendly designs of motion field hole filling and MV smoothing operations are proposed. Such designs can reduce hardware implementation complexity and benefit hardware parallel processing in four aspects:

a. By removing the dependency among different processing block rows for hole filling and MV smoothing so that it is becomes easier and friendlier to achieve hardware parallel processing;
b. By reducing the hardware bandwidth loading overhead;
c. By improving hardware pipeline throughput;
d. By avoiding adding a line buffer to store the data from the above row since a line buffer will increase hardware cost.

Figure 1:
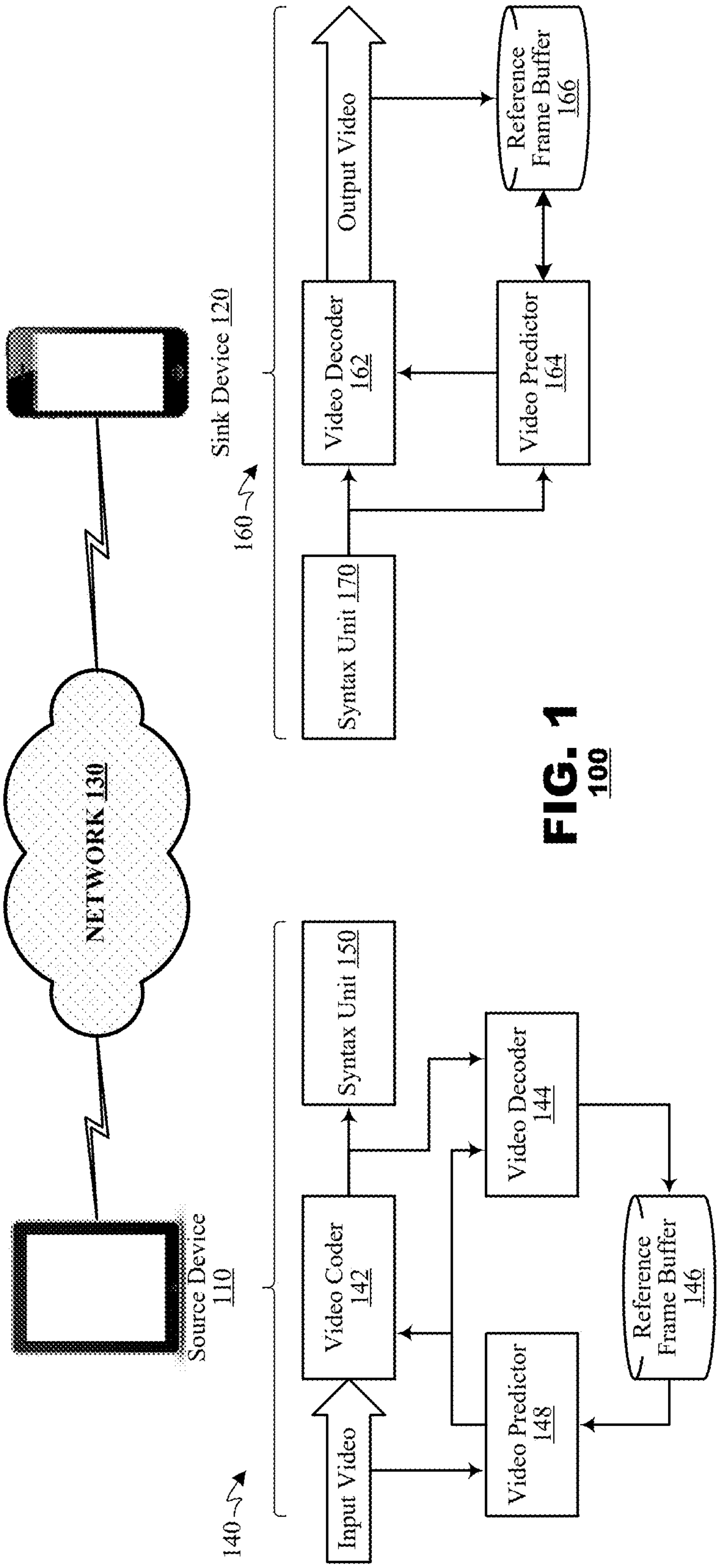
FIG. 1 is a functional block diagram of a video coding system 100 according to an embodiment of the present disclosure.

FIG. 1 is a functional block diagram of a video coding system 100 according to an embodiment of the present disclosure. The system 100 may include a source device 110 provided in communication with a sink device 120 over a network 130. The source device 110 may provide a stream of coded video data to the sink device 120 over the network. The sink device 120 may decoded the coded video data, which may recover a stream of output video data that may be consumed by the sink device 120. Typically, recovered video data is consumed by displaying the recovered video on a display device, by storing the recovered video for later review, or by outputting the recovered video to an application (not shown) executing on the sink device 120 for its use.

A source device 110 may possess a video coding system 140 that generates coded video data from input video. FIG. 1 illustrates typical elements of a video coding system 140 at a high level. A video coding system 140 may have a video coder 142, a video decoder, a reference frame buffer 146, and a video predictor 148. The video coder 142 may generate coded video data from the input video and may output the coded video data to a syntax unit 150 that formats the coded video data for transmission to the sink device 120. The video coder 142 may partition individual frames of video into blocks, sometimes recursively, and may code the blocks on a block-by-block basis. The video coder 142 may code the blocks differentially with reference to predicted blocks that are supplied to the video coder by the video predictor 148. The video predictor 148 may select predicted blocks for use by the video coder 142 by searching among a set of reference frames that are stored in the reference frame buffer 146 for a candidate prediction block that matches content of a block currently being coded by the video coder 142.

The video coding system 140 may select certain coded frames (called "reference frames") to serve as candidates for prediction of blocks for other frames that will be coded later. The video decoder 144 may decode the coded video data generated by the video coder 142 and store recovered frames assembled therefrom in the reference frame buffer 146. The video decoder 144 typically inverts coding operations that are applied by the video coder 142. For blocks coded predictively with reference to prediction block, the video decoder 144 may receive prediction blocks from the video predictor 148 and integrate content of the prediction blocks into decoded blocks prior to output. The video coder's coding operations can be lossy processing operations; thus application of the video coder 142 and the video decoder 144 can result in recovery of a frame that resembles the input frame from which it as derived but with some coding errors.

The syntax unit 150 may integrate coded video data from the video coder 142 with other content streams such as audio streams. The syntax unit 150 typically formats the coded video data according to a protocol determined by a coding standard (e.g., ITU H.265, H264, H.263, or the like) under which the video coding system 140 operates. For blocks where the video coder 142 codes the block differentially with respect to a predicted block, the coded block data may include an identifier of the prediction block that was selected (often by a "motion vector") and its motion type (e.g., translation, zoom, rotation, affine, etc.) as compared to the block being coded. Coded video data may include other identifiers of coding parameters that were selected by the video coder 142 such as identifications of block partitioning, transform type, quantization parameters, designation of select frames as reference frames, and the like. And, of course, coded video data identifies, for each block, the temporal location of the frame from which the block was derived.

A sink device 120 may possess a video decoding system 160 that generates recovered video from the coded video data received from the source device 110. Again, FIG. 1 illustrates typical elements of a video decoding system 160 at a high level. The video decoding system 160 may have a video decoder 162, a video predictor 164, and a reference frame buffer 166. The video decoder 162 may receive coded video data from a syntax unit 170, which parses the coded video data from perhaps other content elements included in the media stream received from the source device 120. The video decoder 162 may invert coding operations applied by the video coder 142 of the source device 120 just as the source device's video decoder 144 does. The video decoder 162 may output a stream of recovered video from the video decoder system 160.

For blocks coded predictively, the video decoder 162 may receive prediction blocks from the video predictor 164 and integrate content of the prediction blocks into decoded blocks prior to output. The video predictor 164 may retrieve prediction blocks from the reference frame buffer according to the motion information, e.g., the motion vectors and motion type identifiers, provided in coded video data.

For frames that are designated to serve reference frames, recovered frame data may be stored in the reference frame buffer 166 for use in decoding later-received coded frames. Operation of the video decoders 144 and 162 between the video coding system 140 and the video decoding system 160 are synchronized so that, in the absence of transmission errors or other communication artifacts that cause a loss of coded video data, the reference frame buffers 146 and 166 of the two systems 140, 160 should have the same state during coding and decoding of a common block of a common frame.

Figure 2:
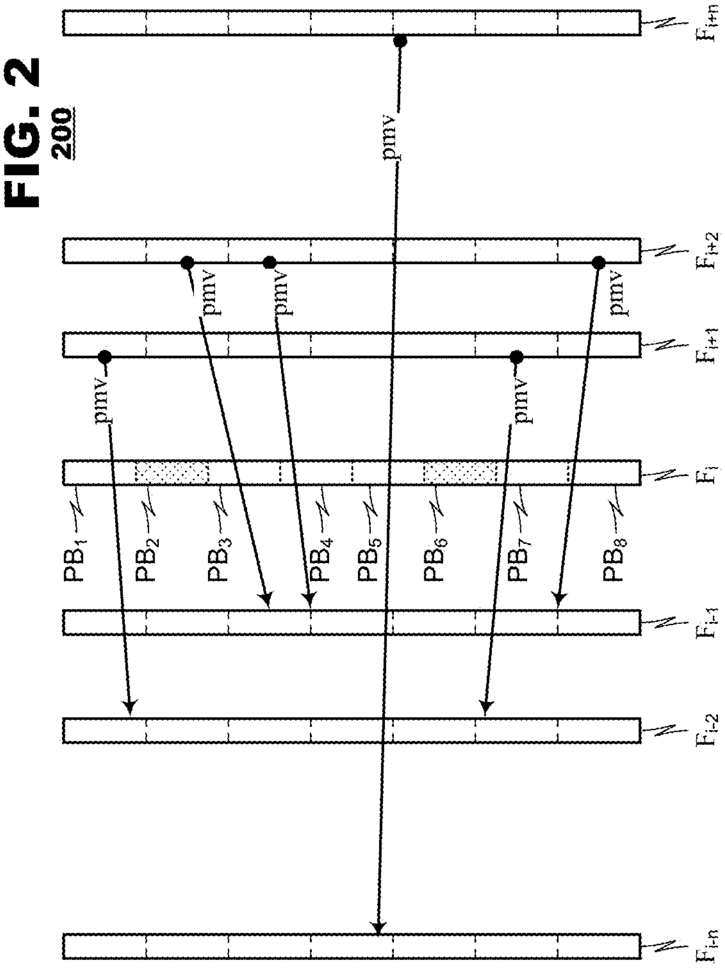
FIG. 2 illustrates application of temporal motion vector prediction in the context of an exemplary video sequence.

FIG. 2 illustrates application of temporal motion vector prediction in the context of an exemplary coded video sequence. In this example, a "current frame" $F_i$ to be coded may draw prediction references from any number of previously coded frames $F_{i-n}$, $F_{i-2}$, $F_{i-1}$, $F_{i+1}$, $F_{i+2}$, and $F_{i+n}$ that are candidates to serve as prediction references for blocks ($PB_1$-$PB_8$) of the current frame $F_i$. These reference frames $F_{i-n}$, $F_{i-2}$, $F_{i-1}$, $F_{i+1}$, $F_{i+2}$, and $F_{i+n}$ are already coded at the time a video coding system 140 (FIG. 1) begins work to code the frame $F_i$. Thus, the video coding system 140 has access not only to the recovered video data corresponding to these candidate reference frames $F_{i-n}$, $F_{i-2}$, $F_{i-1}$, $F_{i+1}$, $F_{i+2}$, and $F_{i+n}$, it also has access to the prediction data, the motion vectors, identifications of reference frames, and identification of motion type, that the video coding system 140 used to predictively code frames $F_{i-n}$, $F_{i-2}$, $F_{i-1}$, $F_{i+1}$, $F_{i+2}$, and $F_{i+n}$. FIG. 2 illustrates exemplary prediction references for the reference frames $F_{i-n}$, $F_{i-2}$, $F_{i-1}$, $F_{i+1}$, $F_{i+2}$, and $F_{i+n}$ as pmv. As illustrated in FIG. 2, a projection of the prediction references pmv may intersect certain pixel blocks $PB_1$-$PB_8$ of the current frame $F_i$. Although not illustrated in FIG. 2, it may occur that, for certain pixel blocks $PB_1$-$PB_8$ of the current frame $F_i$, there are multiple prediction references from the reference frames $F_{i-n}$, $F_{i-2}$, $F_{i-1}$, $F_{i+1}$, $F_{i+2}$, and $F_{i+n}$ that intersect the pixel blocks $PB_1$-$PB_8$.

FIG. 3 illustrates a method 300 according to an embodiment of the present disclosure to select, from among a plurality of candidate reference frames, a reference frame to serve as a prediction reference for a pixel block to be coded. The method 300 may be performed, for example, by a video coder 142 (FIG. 1). The method 300 may assign scores individually to candidate reference frames according to a variety of factors. A first score factor may be assigned based on a temporal distance between the frame being coded (e.g., frame $F_i$ in FIG. 2) and a candidate reference frame (box 310). A second score factor may be assigned based on a quality of coding that was used to code each candidate reference frame (box 320). Another score factor may be assigned based on a temporal distance between each candidate reference frame and its own prediction references (box 330). Another score factor may be assigned based on characteristics of motion prediction references among the candidate reference frames (box 340).

The method 300 may sum the score factors assigned to the candidate reference frames (box 350) and organize the candidate reference frames in a scanning order (box 360) for construction of a motion projection list. The method may predict content for the current frame from a list of candidate reference frames sorted by priority (box. 370). The method 300 thereafter may identify the presence of pixel block holes in a frame being coded by reviewing prediction references among the candidate reference frames as ordered in the motion projection list (box 380).

The score factors may be assigned in a variety of ways. In box 310, reference frames $F_{i-n}$, $F_{i-2}$, $F_{i-1}$, $F_{i+1}$, $F_{i+2}$, and $F_{i+n}$ that have shorter temporal distances to the frame $F_i$ being coded may be assigned relatively higher scores than reference frames that have higher temporal distances to the frame $F_i$ being coded. Exceptions may be made for frames that are designated as being on an opposite side from a scene cut than the frame $F_i$ being coded; in such cases, candidate reference frames on the other side of a scene cut may be assigned lower scores in box 310 than otherwise be assigned based on the temporal distance between those frames and the frame $F_i$ being coded.

In box 320, candidate reference frames $F_{i-n}$, $F_{i-2}$, $F_{i-1}$, $F_{i+1}$, $F_{i+2}$, and $F_{i+n}$ that are coded with relatively high quality may be assigned relatively higher scores than candidate reference frames coded with lower quality. Coding quality may be assessed from a variety of factors. For example, scores may be assigned based on the values of quantization parameters used for quantization of pixel blocks in the candidate reference frames, based on the bit size of the candidate reference frames when coded, based on an estimate of coding distortion when a decoded candidate reference frame is compared to its counterpart in an input video sequence, based on a determination of coefficient thresholding applied, and the like.

In another embodiment, coding quality scores in box 320 may be derived from a candidate reference frame's position in a coding hierarchy defined by prediction references among the candidate reference frames $F_{i-n}$, $F_{i-2}$, $F_{i-1}$, $F_{i+1}$, $F_{i+2}$, and $F_{i+n}$. This is discussed hereinbelow with reference to FIG. 6.

In box 330, candidate reference frames that have relatively short temporal distances to their closest reference frames with the interpolation property may be assigned higher scores than other candidate reference frames that have relatively long temporal distances to their closest reference frames with the interpolation property.

In box 340, scores may be assigned based on characteristics of motion prediction references among the candidate reference frames. For example, motion prediction references that extend between reference frames at opposite temporal locations from the frame being coded (e.g., motion vectors that lead to interpolation of pixel block content) may be assigned higher scores than motion prediction references that extend between reference frames that are located on the same side of the frame being coded. With reference to FIG. 2, the exemplary motion vectors pmv illustrated in FIG. 2 each extend from reference frames $F_{i+1}$, $F_{i+2}$, and $F_{i+n}$ that temporally are located on one side of the frame $F_i$ being coded to other reference frames $F_{i-n}$, $F_{i-2}$, and/or $F_{i-1}$ that are located on the other side of the frame $F_i$ being coded. If a prediction motion vector extended between frames that both are on the same side as the frame $F_i$ being coded, for example, from frame $F_{i+2}$ to frame $F_{i+1}$ (not shown), such a prediction vector may be given a lower score than those prediction motion vectors illustrated in FIG. 2.

FIGS. 4-6 illustrate an exemplary set of frames to which the method of FIG. 3 may be applied. FIG. 4 illustrates a set 400 of frames $F_0$-$F_{16}$ in temporal order; this is the order in which frames may appear in input video or in recovered output video (FIG. 1). Video coding and decoding systems 140, 160 (FIG. 1), however, often process frames in an encoding order that is different from the frames' presentation order. FIG. 5 illustrates a coding sequence 500 that may be applied to the frames $F_0$-$F_{16}$ when they are coded by, for example, a video coder 142 (FIG. 1). Finally, owing to temporal prediction references that extend between the coded frames, the frames $F_0$-$F_{16}$ may be organized into a coding hierarchy 600 of prediction references as shown in FIG. 6.

FIG. 6 assigns the frames $F_0$-$F_{16}$ to different levels of the hierarchy 600 according to the number of prediction references that extend from each frame to a base frame $F_0$ in the sequence. The base frame $F_0$ is shown in a base level of the hierarchy because it makes reference to no other frame in the video sequence. Frame $F_8$ may be coded predictively with reference to frame $F_0$, however, which places frame $F_8$ in a second level of the hierarchy. Frame $F_4$ may be coded predictively with reference frames $F_0$ and/or $F_8$, and therefore it is shown at a third level of the hierarchy. Other frames are assigned to other levels of the hierarchy to show possible permutations of prediction references among the frames.

Operation of the method 300 will be discussed with reference to exemplary frame $F_5$. Assume for purposes of discussion that, at the time frame $F_5$ is processed for coding, reference frames $F_3$, $F_4$, $F_6$, and $F_8$ are available to serve as prediction references. The score factors developed in boxes 310-340 (FIG. 3) will be discussed in context of frame $F_5$.

When coding frame $F_5$, frames $F_4$ and $F_6$ have the shortest temporal distance from frame $F_5$ which are the same as each other. Frames $F_3$ and $F_8$ have longer temporal distances to frame $F_5$. Thus, the score factors assigned to frames $F_4$ and $F_6$ by box 310 may be the same as each other and they may be greater than the score factors assigned to frames $F_3$ and $F_8$ by box 310. The score factors assigned to frames $F_3$ and $F_8$ by box 310 also may be the same as each other.

When coding frame $F_5$, assessments of coding quality may consider not only the coding parameters assigned for the candidate reference frames but also the coding parameters of those candidate reference frames' parent frames. Consider an example where frame $F_4$ is coded using coding parameters such as quantization parameters that indicate frame $F_4$ is a high quality frame. In this circumstance, frame $F_4$ may be given a relatively high score based on the quality of coding assigned to frame $F_4$. If frame $F_6$ is coded predictively with reference to the high-quality frame $F_4$, it, too, may be given a relatively high score based on the quality of coding assigned to frame $F_4$.

As discussed, in box 320, scores may be assigned based on a candidate reference frame's position in a coding hierarchy developed by prediction references among the candidate reference frames $F_{i-n}$, $F_{i-2}$, $F_{i-1}$, $F_{i+1}$, $F_{i+2}$, and $F_{i+n}$. The example of FIG. 6 shows that frame $F_4$ is contained in a third layer of a hierarchy 600 among frames, which may arise because frame $F_4$ is coded predictively with reference to frame $F_8$ and frame $F_8$ is coded predictively with reference to frame $F_0$. FIG. 6 shows that frame $F_6$ is contained in a fourth layer of the hierarchy 600, which may arise because frame $F_6$ is coded predictively with reference to frame $F_4$. In such a circumstance, frame $F_4$ may be assigned a higher score in box 320 than frame $F_6$ because it is placed in a lower layer of the hierarchy as compared to frame $F_6$.

In box 330, scores may be assigned based on a temporal distance between a candidate reference frame and the reference frame to which the candidate reference frame refers in prediction. Continuing with the foregoing example where frame $F_4$ is coded predictively with reference to frame $F_8$ and frame $F_6$ is coded predictively with reference to frame $F_4$, there is a larger temporal distance between frame $F_4$ and its reference frame $F_8$ than between frame $F_6$ and its reference frame $F_4$. In this circumstance, frame $F_6$ may be assigned a higher score than frame $F_4$ in box 330 owing to its shorter temporal distance to its parent reference frame.

A similar analytical approach may be applied for frames $F_9$, $F_{10}$, and $F_{13}$ in the example of FIGS. 4-6. It may occur that, when the method 300 of FIG. 3 considers quality contributions based in candidate reference frames' locations in hierarchical layers and/or their reference to other frames of high quality, that different priority assignments may be achieved using the techniques proposed in FIG. 3 than according to prioritization schemes define by other techniques such as:

TABLE 1

Correct priority assignment for the highest priority of past and future reference frames when building the motion projection list

| | Current Design | | Proposed Design | |
|---|---|---|---|---|
| Frame Index | 1st priority | 2nd priority | 1st priority | 2nd priority |
| 5 | 4 | 6 | 6 | 4 |
| 10 | 8 | 12 | 12 | 8 |
| 9 | 8 | 10 | 10 | 8 |
| 13 | 12 | 14 | 14 | 12 |

In the foregoing table, the current design refers to priority assignments that might be reached by predecessor AOM proposals whereas the proposed design refers to priority assignments that might be reached by the embodiment disclosed in FIG. 3.

For the score-based adaptive motion projection order, besides considering the relationship between the reference frames to the current frame, like the temporal distance, interpolation/extrapolation, and pixel quality, the method 300 also may consider the relationship between the reference frames. As discussed, if two reference frames $F_4$, $F_6$ have the same temporal distance to the current frame $F_5$ and have the same interpolation/extrapolation property, and if one reference frame $F_6$ uses the other reference frame $F_4$ as its reference frame, then the reference frame $F_6$ that uses another reference $F_4$ frame as its reference frame should be assigned with a higher priority compared to the other one $F_4$.

The motion projection order can be achieved by ranking the score of each reference frame:

$$\text{Score} = \text{Function}\big(\text{temporal distance between current frame to the reference frame, the relationship between two highest priority reference frames, interpolation/extrapolation, pixel\_quality, light change, occlusion/disocclusion}\big)$$

Another issue with the AOM score-based adaptive motion projection order is that it does not consider the relationship between the reference frame and its own reference frames. For example, when coding frame $F_5$, frame $F_3$ is the second highest priority past reference frame and frame $F_8$ is the second highest priority future reference frame for frame $F_5$. With the current score based adaptive motion projection order algorithm, frame $F_8$ is assigned with higher priority than frame $F_3$ when building the motion projection list for frame $F_5$ due to the high pixel quality of frame $F_8$ (low hierarchical layer). However, the first reference frame with interpolation property for frame $F_8$ is frame $F_0$ when coding frame $F_5$, the temporal distance is $F_8$ and half of the GOP size. Temporal correlation often reduces with the increase of temporal distance. For reference frame $F_3$, its first reference frame with interpolation property is frame $_6$, the temporal distance between frame $F_3$ and frame $F_6$ is much less than the temporal distance between frame $F_8$ and frame $F_0$. Thus, reference frame $F_3$ should be assigned a higher priority than frame $F_8$ when building the motion projection list for frame $F_5$. A similar improvement can be applied to frames $F_3$, $F_6$, $F_7$, $F_{10}$, $F_{11}$, $F_{13}$ as shown in Table 2.

TABLE 2

Correct priority assignment for the second highest priority of past and future reference frames when building the motion projection list

| | Current Design | | Proposed Design | |
|---|---|---|---|---|
| Frame Index | 3rd priority | 4th priority | 3rd priority | 4th priority |
| 3 | 8 | 1 | 1 | 8 |
| 6 | 16 | 2 | 2 | 16 |
| 5 | 8 | 3 | 3 | 8 |
| 7 | 16 | 5 | 5 | 16 |
| 10 | 16 | 8 | 8 | 16 |
| 11 | 16 | 9 | 9 | 16 |
| 13 | 16 | 11 | 11 | 16 |

In an embodiment, the method 300 may consider relationships between the reference frames and their own first reference frame with interpolation property relative to the current frame. When coding a frame, if one reference has higher priority than another reference frame, but the temporal distance between this reference frame to its own first reference frame with interpolation property is much larger than another reference frame to its own first reference frame with interpolation property, then another reference frame with small temporal distance to its own first reference frame with interpolation property should be assigned with high priority. For example, as in the example shown in FIG. 6, frame $F_3$ and frame $F_8$ are two reference frames when coding frame $F_5$, and based on the current score based adaptive motion projection order algorithm, frame $F_8$ will be assigned with high priority since it has high pixel quality. However, the temporal distance of frame $F_8$ to its own first reference frame with interpolation property, frame $F_0$, is much larger than the temporal distance of frame $F_3$ to its own first reference frame with interpolation property, frame $F_6$. Therefore, instead of assigning high priority for frame $F_8$, frame $F_3$ should be assigned higher priority than frame $F_8$ when building the motion projection list for coding frame $F_5$.

In a particular embodiment of the proposed algorithm, the motion projection list may be generated as follows:

```
Scan Order:
temporal_dist_2nd_past = temporal distance between 2nd closest past
reference to its own first reference frame with interpolation property
temporal_dist_2nd_future = temporal distance between 2nd closest future
reference to its own first reference frame with interpolation property
if ( closest past is the reference frame of the closest future) {
   if (temporal_dist_2nd_past < temporal_dist_2nd_future) {
      Scan Order: closest future, closest past, 2nd closest past, 2nd
      closest future
   } else {
      Scan Order: closest future, closest past, 2nd closest future, 2nd
      closest past
   }
} else {
   if (temporal_dist_2nd_past < temporal_dist_2nd_future) {
      Scan Order: closest past, closest future, 2nd closest past, 2nd
      closest future
} else {
      Scan Order: closest past, closest future, 2nd closest future, 2nd
      closest past
   }
}
```

The algorithm may apply a maximum allowed number of predictors, for example, three predictors. Moreover, the algorithm may operate according to an overwrite rule in which a motion vector from a lower priority reference frame will not overwrite the motion information assigned by a higher priority reference frame.

Adaptive TMVP motion projection order can be achieved by assigning and ranking scores of each reference frame using functions that consider:

a. Temporal distance between the reference frame to the current frame b. Temporal distance between the reference frame and its own first reference frame with interpolation property c. The relationship between two reference frames: is one reference frame a reference of another reference frame d. Interpolation or extrapolation e. Pixel quality of the reference frame f. Light change g. Occlusion or disocclusion The score can be modeled as a function of, but not limited to, the temporal distance between the current frame to its reference frame, temporal distance between the reference frame and its own first reference frame with interpolation property, the relationship between two reference frames: is one reference frame a reference of another reference frame, interpolation/extrapolation, pixel_quality, light change, and occlusion/disocclusion. The function can be, but not limited to linear models, nonlinear models, decision tree, neural network, SVM (support vector machine) models, etc.

In an embodiment, a video coder 142 (FIG. 1) may explicitly signal the motion projection scanning order to the decoder 162. The signaling can be done at a sequence, frame, tile, or slice level of a governing coding protocol.

A hierarchical layer structure can also be utilized to signal the motion projection scanning order to improve signaling efficiency. The scanning order of motion projection can be simultaneously controlled at different levels of a coding syntax, such as in a VPS (video parameter set), SPS (sequence parameter set) or PPS (picture parameter set) layers, and/or at the frame level and slice or tile level. A highest level can signal the scanning order of all reference frames in the motion projection list, but then the lower levels can signal the scanning order of a subset of reference frames to refine the overall scanning order of motion projection. In this instance, the remaining part may use the motion projection scanning order signaled in the higher level. For example, the motion projection scanning order of all N possible reference frames could be signaled in the SPS, then, in the PPS, the scanning order of the first M reference frames could be further refined, where $M<N$. In this example, the scanning order of the remaining $N-M$ reference frames will just use the scanning order as defined in the SPS. A similar approach can be applied to the slice or tile level, where, at the slice and tile level, only a part of the scanning order from the PPS or SPS will be refined.

In an alternative embodiment, a video coder 142 may define several different scanning order sets and signal them in a higher level syntax, and then, at lower levels, the video coder 142 can select a set by using a set index. This can help reduce the signaling cost at lower levels compared to explicitly signaling the scanning order.

Returning to FIG. 2, the motion vectors of reference frames $F_{i-n}$, $F_{i-2}$, $F_{i-1}$, $F_{i+1}$, $F_{i+2}$, and $F_{i+n}$ may be used to derive content of pixel blocks $PB_1$-$PB_8$ of the current frame $F_i$. It is not guaranteed, however, that prediction references pmv from the candidate reference frames $F_{i-n}$, $F_{i-2}$, $F_{i-1}$, $F_{i+1}$, $F_{i+2}$, and $F_{i+n}$ will intersect all pixel blocks $PB_1$-$PB_8$ of the current frame $F_i$. In the example of FIG. 2, pixel blocks $PB_2$ and $PB_6$ are illustrated as having no intersection with the prediction references pmv from the candidate reference frames $F_{i-n}$, $F_{i-2}$, $F_{i-1}$, $F_{i+1}$, $F_{i+2}$, and $F_{i+n}$. A pixel block (say, $PB_2$ and $PB_6$) that does not intersect with the field of prediction references pmv from the candidate reference frames $F_{i-n}$, $F_{i-2}$, $F_{i-1}$, $F_{i+1}$, $F_{i+2}$, and $F_{i+n}$ is deemed to present a “hole” in this field of prediction references pmv.

Figure 7:
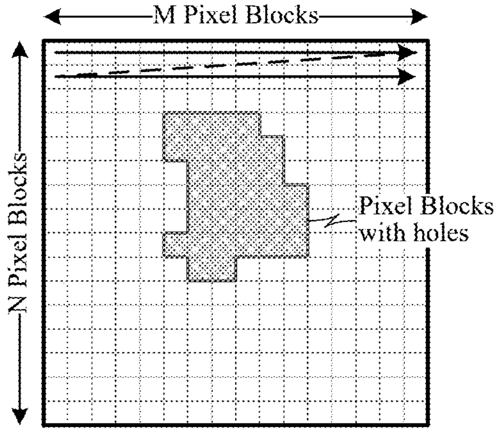
FIG. 7 illustrates application of temporal motion vector prediction in the context of an exemplary frame.

FIG. 2 illustrates a one-dimensional projection of exemplary pixel blocks in a current frame $F_i$. FIG. 7 illustrates the phenomenon of holes in a two dimensional representation 700 of a current frame $F_i$. In cases where content of pixel blocks cannot be derived through temporal motion prediction, some other derivation technique is used.

Figure 8:
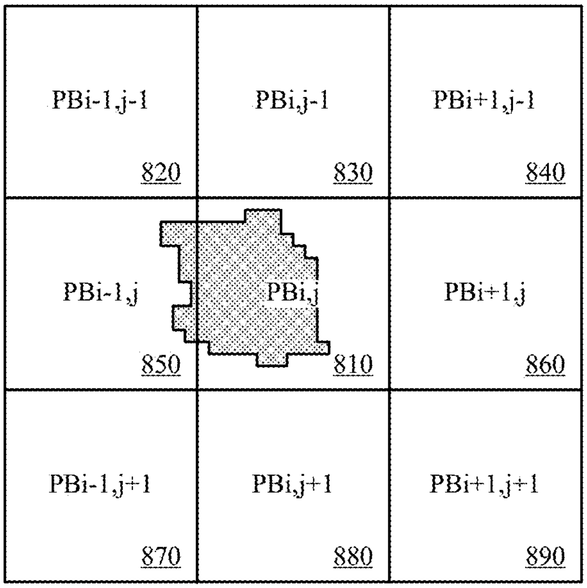
FIG. 8 illustrates granularities of processing blocks for derivation of hole content according to an embodiment of the present disclosure.

Embodiments of the present invention apply hole derivation techniques in which hole content for a processing block 810, shown in FIG. 8, is derived from predicted portions of a frame that are selected to have a predetermined size. Thus, instead of utilizing the projected motion fields of an entire frame for hole filling and motion vector smoothing, only the projected motion fields within the processing block 810 of a predetermined size are utilized. In one embodiment, the size of the processing block 810 may be aligned with the size of the largest coding units available in a governing coding standard, such as a superblock (SB) or a coding tree unit (CTU). For example, the maximum allowed SB size in AOM AV1 and the AVM is 128×128 pixels. Thus, in the example shown in FIG. 8, the processing block 810 may be constrained to be of size 128×128 pixels and the unit size of each TMVP block (not shown) within the processing block is set to 8×8 pixels.

It is expected that, by restricting hole derivation techniques to processing blocks 810 of predetermined sizes, the operation of such hole derivation techniques will be improved by reducing processing dependency issues that can arise in microprocessor programming environments. As compared to implementations in which hole derivation techniques utilize content from processing blocks proximate 820-890 to the processing block 810 at issue, an embodiment that restricts hole filling to a processing block 810 of predetermined size can reduce processing dependency issues that arise when a processing pipeline that operates on a first number of pixel blocks (say, pixel blocks 820-840). Other fixed specific processing block sizes can also be defined for hardware parallel processing.

In an embodiment, processing block sizes may be selected to be slightly larger than the largest coding unit size that is supported by a coding protocol. For example, in a coding environment where a largest coding unit is 128×128 pixels, the processing block size may be selected to be 144×144 pixels, which accommodates motion fields from and near the current processing block, and especially around the boundary of the processing block.

In a further embodiment, the constraint can be relaxed by allowing the processing block 810 to utilize the motion fields from the current block’s left and right processing blocks 850, 860. As show in FIG. 8, the left and right processing blocks 850, 860 can be utilized for hole filling and MV smoothing of the current processing block 810 since oftentimes they will not affect the hardware parallel processing, and content from those blocks 850, 860 improve the motion field quality especially around the current processing block’s 810 vertical boundary.

In an alternative embodiment, if the hardware can tolerate the complexity of accessing above and bottom processing blocks 830, 880, the constraint can be relaxed to allow the access of the motion fields from casual above and bottom blocks 830, 880, which can increase coding gain.

In an alternative embodiment, processing block constraints may allow utilization of motion fields from the current 810 and the left processing block 850 for hole filling and MV smoothing since it can mitigate the waiting cycles while maintaining coding gains.

Additional processing blocks on the left and/or right can also be considered for hole filling and MV smoothing. The coding specification and consequently any hardware implementations of encoders and decoders of such specification can be designed based on a desired waiting cycle and coding gain tradeoff, which can help determine how many processing blocks on the left and/or right can be utilized for hole filling and MV smoothing, or some blocks from above and bottom might also be allowed.

The processing block size can also be different for hole filing and MV smoothing. This can be signaled at a different level (e.g. frame level, sequence level, etc.). It can be the same or different from the processing block size used for motion projection.

The foregoing discussion has described operation of the video coders and video decoders of the present disclosure in the context of source and sink devices. Commonly, these components are provided as electronic devices. Video coders and decoders can be embodied in integrated circuits, such as application specific integrated circuits, field programmable gate arrays and/or digital signal processors. Alternatively, they can be embodied in computer programs that execute on personal computers, notebook computers, tablet computers, mobile devices, media players and other consumer devices. Such computer programs typically are embodied as program instructions stored in physical storage media such as electronic-, magnetic- and/or optically-based storage devices, where they are read to a processor and executed. And, of course, these components may be provided as hybrid systems that distribute functionality across dedicated hardware components and programmed general-purpose processors, as desired.

The foregoing description has been presented for purposes of illustration and description. It is not exhaustive and does not limit embodiments of the disclosure to the precise forms disclosed. Modifications and variations are possible in light of the above teachings or may be acquired from the practicing embodiments consistent with the disclosure. Unless described otherwise herein, any of the methods may be practiced in any combination.

We claim:

1. A video processing method, comprising:

estimating content for a current frame to be coded from motion vector predictors of previously coded reference frames, determining, following the estimating, whether a content hole exists for the current frame, and when a content hole is determined to exist, on a processing block by processing block basis, deriving content for a processing block-sized portion of the content hole from other content of the respective processing block, wherein the processing block has a predetermined size.

2. The method of claim 1, wherein the size of the processing block aligns with a size of a largest coding unit of a governing video coding protocol.

3. The method of claim 1, wherein the size of the processing block is greater than a size of a largest coding unit of a governing video coding protocol.

4. The method of claim 1, wherein the size of the processing block encompasses multiple instances of a largest coding unit of a governing video coding protocol but confined to a common row in which the coding unit exists.

5. The method of claim 1, wherein the predetermined size of the processing block is smaller than the size of the current frame.

6. The method of claim 1, further comprising coding source content of the current frame differentially with respect to the estimated content of the current frame.

7. The method of claim 6, further comprising transmitting the coded source content over a network.

8. The method of claim 1, further comprising decoding content of the current frame additively with respect to the estimated content of the current frame and coded content of the current frame received from a network.

9. The method of claim 1, wherein the other content is motion field content of the respective block.

10. Computer readable medium storing program instructions that, when executed by a processor, caused the processor to perform a video processing method, comprising:

estimating content for a current frame to be coded from motion vector predictors of previously coded reference frames, determining, following the estimating, whether a content hole exists for the current frame, and when a content hole is determined to exist, on a processing block by processing block basis, deriving content for a processing block-sized portion of the content hole from other motion content of the respective processing block, wherein the processing block has a predetermined size.

11. The medium of claim 10, wherein the size of the processing block aligns with a size of a largest coding unit of a governing video coding protocol.

12. The medium of claim 10, wherein the size of the processing block is greater than a size of a largest coding unit of a governing video coding protocol.

13. The medium of claim 10, wherein the size of the processing block encompasses multiple instances of a largest coding unit of a governing video coding protocol but confined to a common row in which the coding unit exists.

14. The medium of claim 10, wherein the predetermined size of the processing block is smaller than the size of the current frame.

15. The medium of claim 10, further comprising coding source content of the current frame differentially with respect to the estimated content of the current frame.

16. The medium of claim 15, further comprising transmitting the coded source content over a network.

17. The medium of claim 10, further comprising decoding content of the current frame additively with respect to the estimated content of the current frame and coded content of the current frame received from a network.

18. The medium of claim 10, wherein the instructions cause the processor to perform the method in a pipelined fashion, working on multiple processing block-sized portions of the content hole on a processing block-by-processing block basis.

19. The medium of claim 10, wherein the other content is motion field content of the respective block.

20. An apparatus, comprising:

a processor;

a memory coupled to the processor, the memory having a buffer portion to store data associated with a current frame to be coded and previously coded reference frames, the memory also storing program instructions that, when executed, cause the processor to: estimate content for a current frame to be coded from motion vector predictors of the previously coded reference frames, determine, following the estimating, whether a content hole exists for the current frame, and when a content hole is determined to exist, on a processing block by processing block basis, derive content for a processing block-sized portion of the content hole from other motion content of the respective processing block, code source content of the current frame differentially with respect to the estimated content of the current frame, wherein the processing block has a predetermined size; and a transmitter to transmit the coded source content over a network.

21. The medium of claim 20, wherein the size of the processing block aligns with a size of a largest coding unit of a governing video coding protocol.

22. The medium of claim 20, wherein the size of the processing block is greater than a size of a largest coding unit of a governing video coding protocol.

23. The medium of claim 20, wherein the size of the processing block encompasses multiple instances of a largest coding unit of a governing video coding protocol but confined to a common row in which the coding unit exists.

24. The medium of claim 20, wherein the predetermined size of the processing block is smaller than the size of the current frame.

25. The medium of claim 20, further comprising decoding content of the current frame additively with respect to the estimated content of the current frame and coded content of the current frame received from a network.

26. The medium of claim 20, wherein the instructions cause the processor to perform the method in a pipelined fashion, working on multiple processing block-sized portions of the content hole on a processing block-by-processing block basis.

27. The medium of claim 20, wherein the other content is motion field content of the respective block.

* * * * *